United States Patent [19]

Arechaga

[11] 4,300,665
[45] Nov. 17, 1981

[54] SWITCH DEVICE FOR SELF-RETRACTING CORD REEL

[75] Inventor: John C. Arechaga, Lansdale, Pa.

[73] Assignee: Ametek, Inc., New York, N.Y.

[21] Appl. No.: 143,795

[22] Filed: Apr. 25, 1980

[51] Int. Cl.³ .......................................... H02G 11/02
[52] U.S. Cl. ................................ 191/12.4; 200/153 F
[58] Field of Search ..................... 191/12.2 R, 12.2 A, 191/12.4; 200/153 F, 60

[56] References Cited

U.S. PATENT DOCUMENTS

| 2,438,082 | 3/1948 | Wester | 191/12.2 R X |
| 2,453,407 | 11/1948 | Burns | 200/153 F |
| 3,904,843 | 9/1975 | Kendechy | 200/153 F |
| 4,154,324 | 5/1979 | Upton | 191/12.2 R |

Primary Examiner—Richard A. Schacher
Attorney, Agent, or Firm—George J. Harding, 3rd

[57] ABSTRACT

A switch device is used in a self-retracting cord reel having a housing, a rotating drum, and an electrical cord having a portion thereof wound on the drum, a spring motor for rewinding the cord on the drum, a ratchet, a pawl having a first stop position for engaging the ratchet to stop the reel from rewinding the cord and a second position permitting the reel to rewind the cord, the positioning of the pawl being controlled by the movement of the reel with the cord. A switch is secured to the drum in circuit with the cord and is biased to one of its two positions. Switch operating mechanism is adapted to be moved by the pawl for placing the switch in the other position when the pawl is in its stop position.

3 Claims, 11 Drawing Figures

SWITCH DEVICE FOR SELF-RETRACTING CORD REEL

TECHNICAL FIELD

This invention is in the field of self-retracting reels for electrical cord.

BACKGROUND OF THE PRIOR ART

Self-retracting reels for electrical cord are well-known to the prior art. It is also known to provide such reels with a spring motor, a fixed ratchet and a pawl having a first stop position for engaging the ratchet to stop the reel from rewinding the cord and a second position for permitting the reel to rewind the cord. Reference may be had to Husted U.S. Pat. No. 2,976,959 and Ewald U.S. Pat. No. 2,270,283, the disclosures of both of these patents being incorporated herein by reference.

It is also known to use remote switches in association with such cord reels which can be actuated by movement of the cord in order to lessen the hazard of such equipment when used in an environment which may contain explosive gases or liquids. Such remote switch is disclosed in U.S. Pat. No. 3,904,843 disclosing a ball attached near the outer end of the cord and adapted to rock a switch operating member when the cord is fully retracted. The latter system presents a number of problems. First, when the cord is being unwound there is a tendency for the cord to engage the arm and rotate it periodically causing the light to flicker. It is also possible for the ball to get out of engagement with the rotatable arm when the cord is fully wound, thus causing gravity to rotate the arm and the light to go on.

BRIEF SUMMARY OF THE INVENTION

A switch device is used in a self-retracting cord reel having a housing, a rotating drum, and an electrical cord having a portion thereof wound on the drum, a spring motor for rewinding the cord on the drum, a ratchet, a pawl having a first stop position for engaging the ratchet to stop the reel from rewinding the cord and a second position permitting the reel to rewind the cord, the positioning of the pawl being controlled by the movement of the reel with the cord. A switch is secured to the drum in circuit with the cord and is biased to one of its two positions. Switch operating mechanism is adapted to be moved by the pawl for placing the switch in the other position when the pawl is in its stop position.

DETAILED DESCRIPTION OF PREFERRED EMBODIMENT

Figure 1:
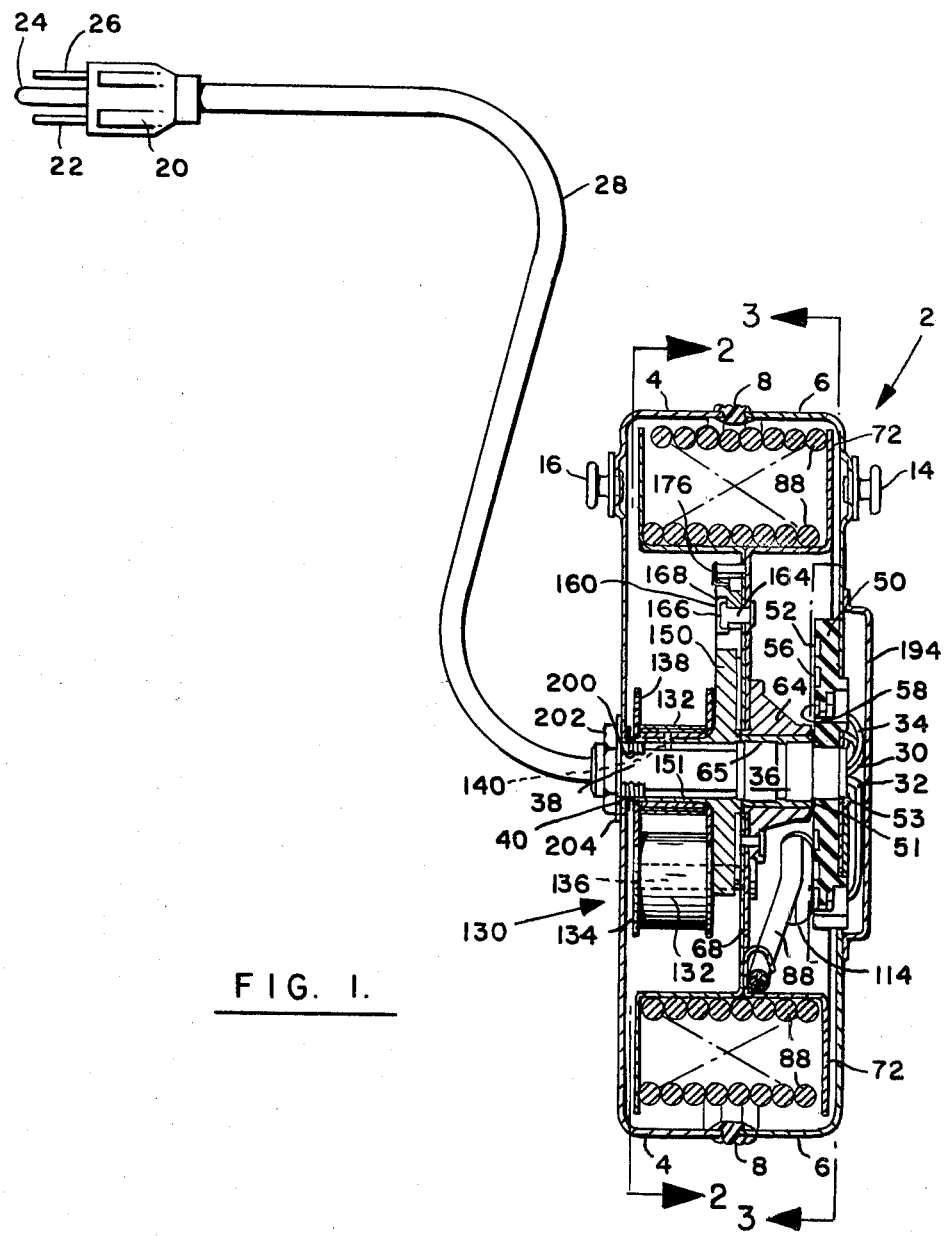
FIG. 1 is a vertical section through the axis of the arbor of a device in accordance with the invention.
Figure 2:
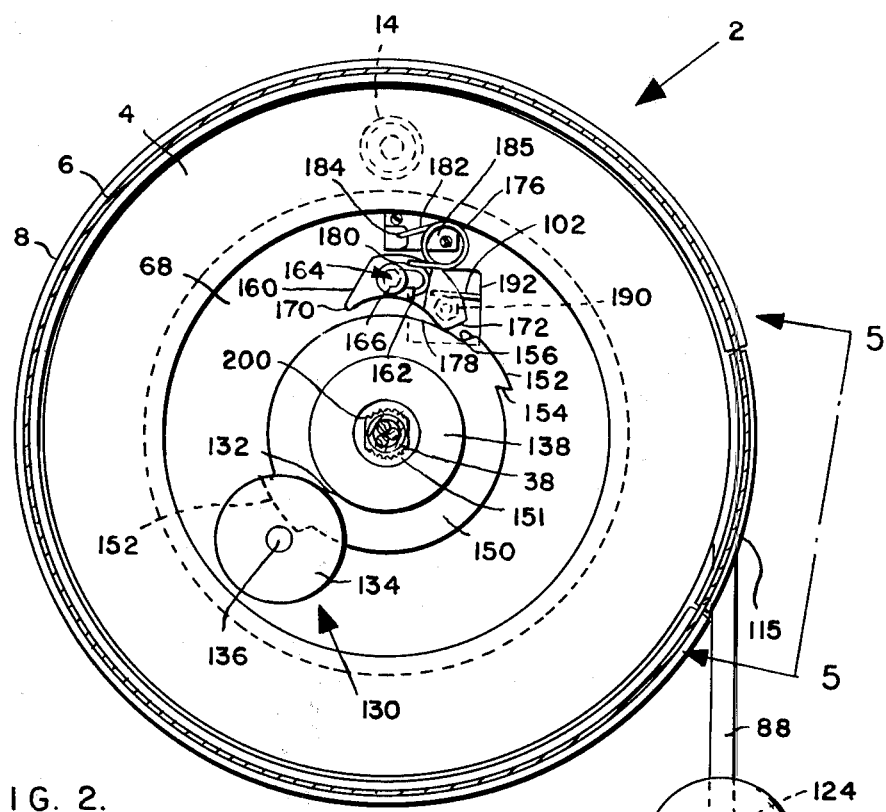
FIG. 2 is a sectional view taken on the plane indicated by the line 2—2 in FIG. 1.

A self-retracting cord reel 2 (FIG. 1) has a pair of cup-shaped housing members 4 and 6 which have a grooved resilient band 8 therebetween (FIG. 2). Housing members 4 and 6 are provided with trunnions 14 and 16, respectively, which are adapted to be received by a mounting bracket (not shown) for suspending the cord reel from an overhead member such as a beam.

Figure 4:
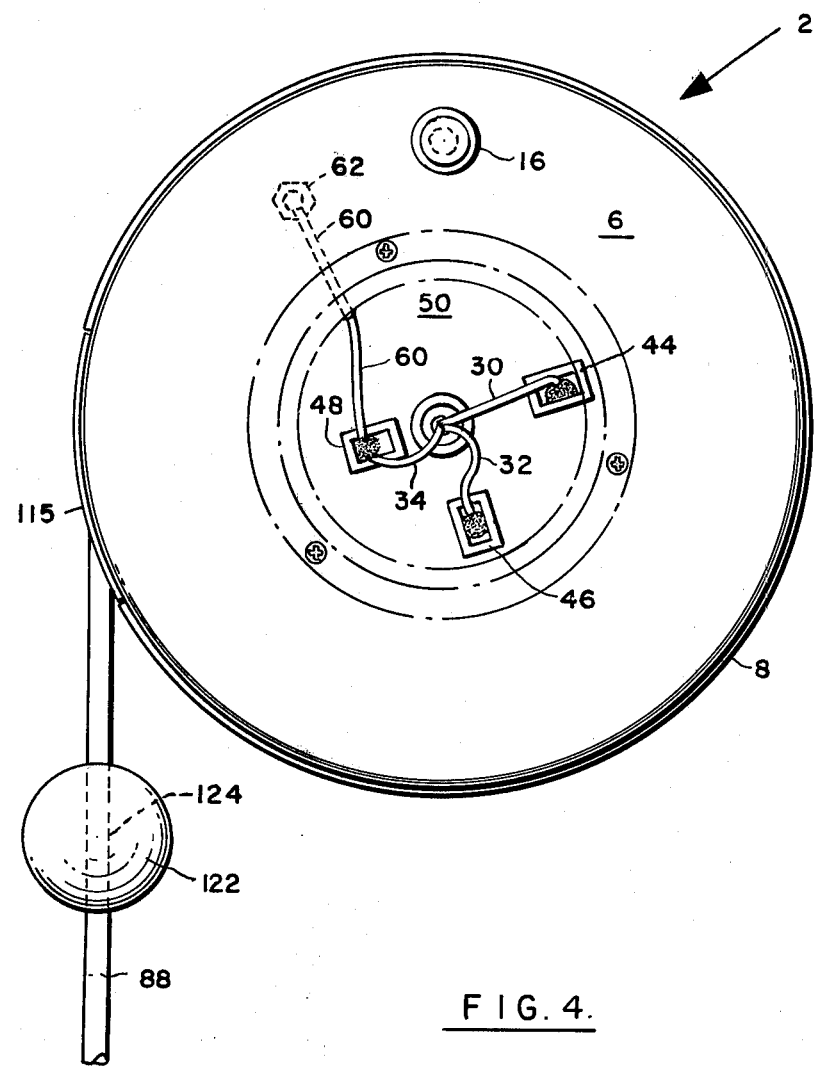
FIG. 4 is a rear elevation of the device of FIG. 1 with the cover plate removed.
Figure 6:
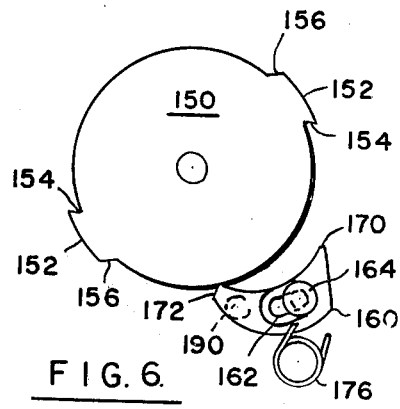
FIGS. 6 through 11 are schematic views showing the various relative positions of the rachet and the pawl of the device of FIG. 1 in various steps of the operation of the device.

An electrical plug 20 having connectors 22, 24 and 26, with connector 24 being for connection to ground, is secured to a length of insulated wiring 28 having wires 30, 32 and 34 connected respectively to connectors 22, 26 and 24. Wiring 28 passes through a round hollow arbor 36 having an asymmetrical portion 38 (FIG. 1) engaged in a corresponding asymmetrical opening 40 in casing member 4 to prevent relative rotation between casing member 4 and arbor 36. Wire 30 is secured to a connector 44 in ring block 50 (FIG. 4) which is mounted on arbor 36. Ring block 50 is anchored between arbor flange 51 and a rolled over portion of arbor 36 (FIG. 1). Connector 44 is connected to conductor ring 52 mounted in ring block 50. Similarly, wire 32 is secured to a connector 46 connected to conductor ring 56 and wire 34 is secured to a connector 48 which is secured to conductor ring 58. A wire 60 connects connector 48 to a connector 62 which is secured to the inside of housing member 6.

Figure 5:
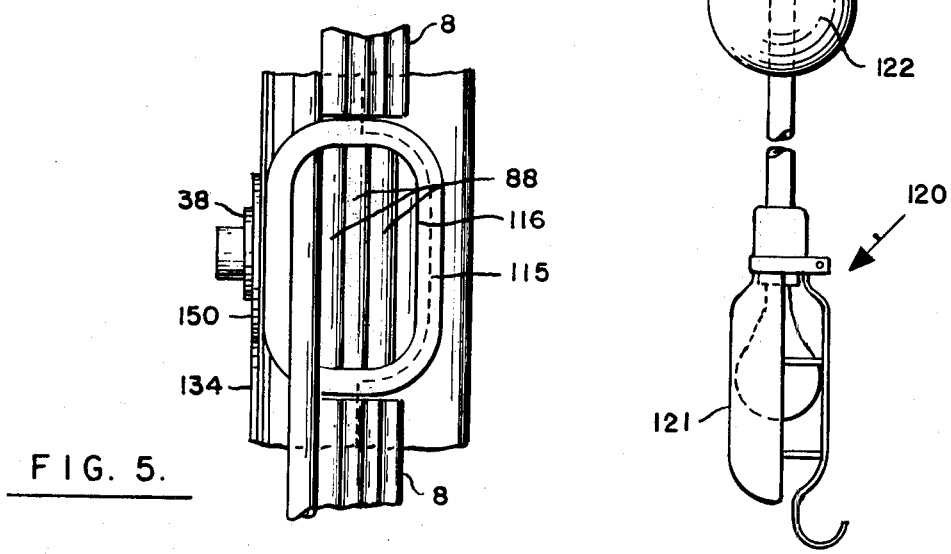
FIG. 5 is an elevational view, partially broken away, showing the grommet through which the electrical cord passes.
Figure 3:
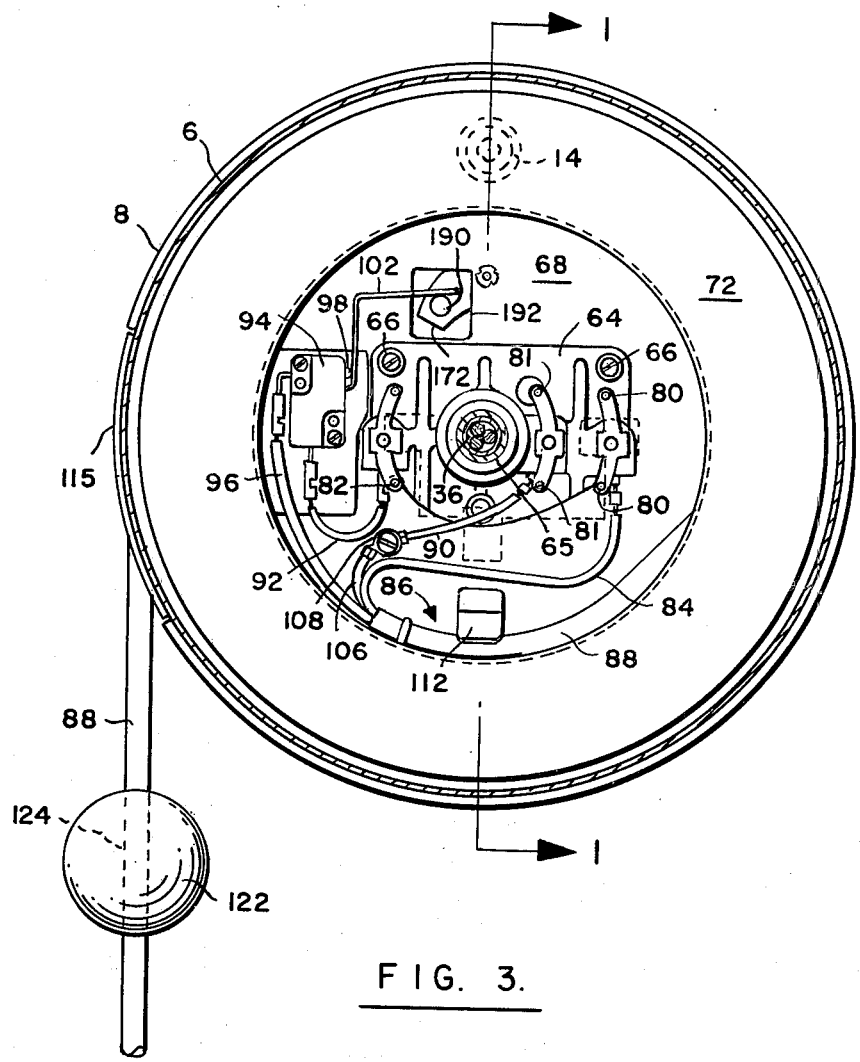
FIG. 3 is a sectional view taken on the plane indicated by the line 3—3 in FIG. 1.

A brush block 64 (FIG. 3) having a bushing 65 of, for example nylon, is mounted for rotation on arbor 36 and is secured by rivets 66 to the central inner wall 68 of a flanged drum 72. Brush contacts 80, 81 and 82 mounted on brush block 64 are in contact respectively with conductor rings 52, 58 and 56. Brush contact 80 is connected to wire 84 which forms part of a three-conductor electrical cord 86 having an insulating cover 88. Brush contact 81 is connected to wire 90 which in turn is connected to wall 68 of drum 72 at 108. Brush contact 82 is connected to a wire 92 which in turn is in series with a switch 94 and a wire 96 which forms part of cord 86. Switch 94 is secured to wall 68 so as to rotate with drum 72 and has an operating button 98 biased to the switch open position. Switch 94 has an operating arm 102 which is adapted to engage button 98 to move it to the switch closed position. A ground wire 106 of cord 86 is connected to wall 68 of drum 72 at 108 and hence also to wire 90. Cord 88 is frictionally restrained by a clip 112 secured to wall 68. Cord 88 passes through opening 114 in drum 72 and, as shown in FIG. 1, is wound on the drum with its terminal portion extending through a grommet 115 in an opening 116 formed in housing members 4 and 6 (FIG. 5). The outer end of cord 86 is connected to a conventional trouble light 120 with ground wire 106 being connected to guard 121 of trouble light 120 in a conventional manner (not shown). A resilient ball 122, preferably of rubber, has a bore 124 receiving cord 86 in tight frictional engagement. Ball 122 is larger than grommet 115 and acts as a stop to limit the rewinding of the cord 86 on drum 72.

As seen in FIG. 2, drum 72 is driven by a conventional "B"-motor 130 (see Transactions of the ASME for May 1952 which is incorporated herein by reference). Motor 130 employs a non-cumulative force spring 132 which is tightly wound on a storage bushing 134 mounted for rotation on a pin 136 secured to wall 68. Spring 132 is backwound onto an output drum 138 which is fixedly secured to arbor 36 by a pin 140. Motor 130 causes drum 72 to rotate counterclockwise as viewed in FIG. 2 to coil cord 86 onto drum 72.

A ratchet 150 (FIG. 2) is fixedly secured to arbor 36 by a hub 151 interposed between the drum 138 and arbor 36 and has a pair of opposed teeth 152,152 each having an undercut end 154 and a cam end 156. A pawl 160 adapted to engage teeth 152 has a slot 162 through which passes a pin 164 secured to wall 68 (FIG. 1). Pin 164 has a head 166 accommodated in a recessed portion 168 in pawl 160. Pawl 160 has a nose portion 170 at one end and a cam face 172 at its other end (FIG. 2). A torsion spring 176 has an arm 178 engaged in an opening 180 in pawl 160 above the center of slot 162 and another arm 182 engaged in an opening 184 in wall bracket 185 secured to wall 68. Spring 176 functions to pivot pawl 160 clockwise, as viewed in FIG. 2, when pin 164 is in the left-hand end of slot 162 and conversely pivot the pawl counterclockwise when pin 164 is in the right-hand end of slot 162. A pin 190 (FIG. 3) secured to pawl 160 passes through an opening 192 in wall 68 and is adapted to engage switch operating lever 102 to operate switch 94 when pawl 160 is pivoted counterclockwise as viewed in FIG. 2.

A cover 194 is secured to housing member 6 to cover ring block 50 and its associated wires.

Arbor 36 is threaded at 200 and carries nut 202 to secure the assembly together. A washer 204 is interposed between the nut and housing member 4.

OPERATION

Figure 7:
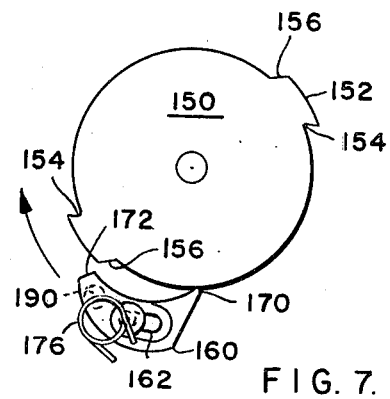
Figure 8:
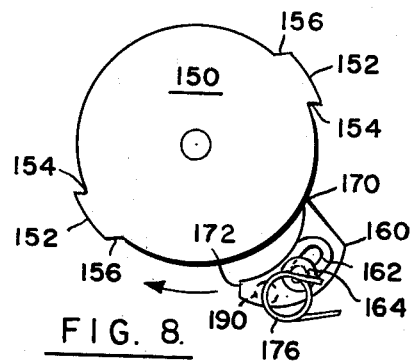
Figure 9:
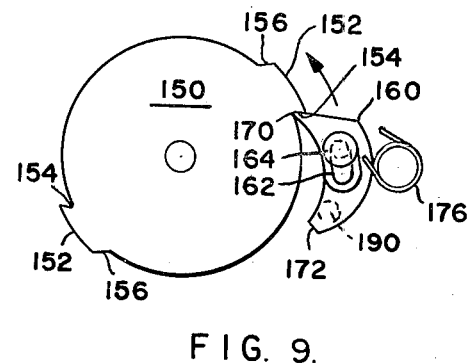
Figure 10:
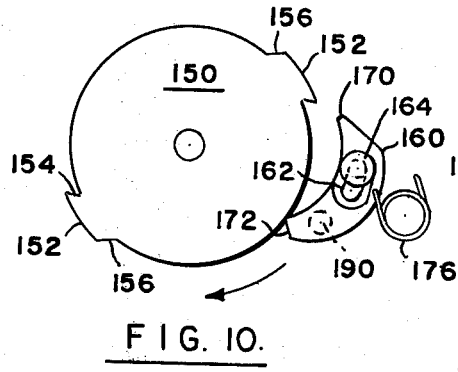
Figure 11:
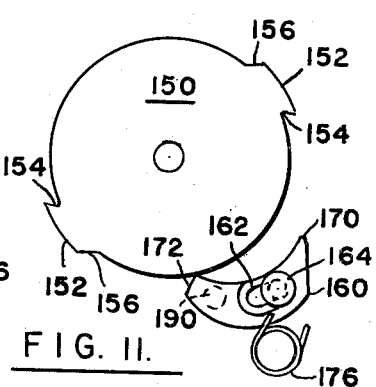

The operation of the switch device will be described in conjunction with FIGS. 6–11. With the motor 130 having fully retracted cord 86 and ball 122 being against grommet 115, the pawl 160 is in the position shown in FIG. 6, i.e. pivoted clockwise about pin 164, with pin 190 positioned with respect to switch operating arm 102 so that switch 94 is open. The user will grasp trouble light 120 and carry it to the location where it is to be used causing the unwinding of cord 86 from drum 72 and the consequent rotation of drum 72 clockwise as viewed in FIG. 2. As pawl 160 is bodily rotated clockwise along with drum 72, cam end 172 engages cam end 156 of the adjacent ratchet tooth 152 causing the shifting of pawl 160 to place pin 164 in the other end of slot 162 and then causing pawl 160 to be cammed outwardly away from tooth 152 and permitting spring 176 to urge pawl 160 of its maximum counterclockwise position with respect to pin 164 as shown in FIG. 7 which causes pin 190 to move switch operating lever 102 sufficiently to urge switch button 98 to close switch 94 and thus turn on drop light 120. As the drum 72 continues to rotate cam end 172 of pawl 160 clears teeth 152 so as not to obstruct the unwinding of cord 86 as shown in FIG. 8. When the trouble light 120 is in the desired position, the user permits spring motor 130 to rotate drum 72 counterclockwise until the nose portion 170 of pawl 160 engages the undercut end 154 of a tooth 152 which causes pawl 160 to be moved relative to pin 164 to place the pin in the end of slot 162 closest to nose 170 at which point the pawl prevents the further counter-rotation of drum 72 (see FIG. 9). The undercut portion 154 in cooperation with nose portion 170 retains the pawl rotated counterclockwise as viewed in FIG. 2 with respect to pin 164 and thus keeps the switch 94 on.

When the user is finished with the trouble light 120, he advances the cord 86 sufficiently to rotate drum 72 and pawl 160 until pawl 160 is clear of tooth 152 (FIG. 10) at which time spring 176 rotates pawl 160 clockwise with respect to pin 164 causing pin 190 to release switch operating lever 102 to permit switch 94 to open and the light to go out. The pawl 160 is now ready to have motor 130 rotate drum 172 to reel in cord 86, the nose portion 170 of pawl 160 being maintained clear of teeth 152. The operation is completed with pawl 160 in the position shown in FIG. 11 when ball 122 comes into contact with grommet 115 to stop the further rotation of drum 72.

It will be understood that the above-described embodiment is illustrative and is not intended to be limiting.

I claim:

1. In a self-retracting cord reel having a rotating drum with a hub mounted for rotation on an arbor, an electrical cord having a portion thereof wound on the drum, a ratchet secured to the arbor, a pawl having a slot engaged by a pin secured to the hub, a spring urging the pawl inwardly at a point over the center of the slot for pivoting the pawl about the pin when the pawl is moved by engagement with the ratchet to shift the pin from one end of the slot to the other end of the slot and then released from the ratchet for shifting the pawl between a stop position and a rewind position and means to move the pawl to shift the pin from said other end of the slot to said one end of the slot at the commencement of unwinding the cord to cause the spring to place the pawl in the stop position to engage the ratchet when the reel starts to rewind the cord, the improvement comprising:
 a switch biased to the open position in series with the cord secured to the hub,
 a switch operating member adapted to be engaged by the pawl for closing the switch when the pawl is in the stop position.

2. In a self-retracting cord reel having a rotating drum with a hub mounted for rotation on an arbor, an electrical cord having a portion thereof wound on the drum, a ratchet secured to the arbor, a pawl having a slot engaged by a pin secured to the hub and a spring urging the pawl inwardly at a point over the center of the slot for pivoting the pawl about the pin when the pawl is moved by engagement with the ratchet to shift the pin from one end of the slot to the other end of the slot for shifting the pawl between a stop position and a rewind position, the improvement comprising:
 a switch biased to the open position which is in series with the cord and secured to the hub, said switch being secured to the opposite side of the hub from the pawl and having an operating member, and
 a pin secured to the pawl and passing through an opening in the hub to engage the switch operating member and close the switch when the pawl is in the stop position.

3. In a self-retracting cord reel having a rotating drum with a hub mounted for rotation on an arbor, an electrical cord having a portion thereof wound on the drum and having a light bulb socket at its outer end, a ratchet secured to the arbor, a pawl having a slot engaged by a pin secured to the hub, a spring urging the pawl inwardly at a point over the center of the slot for pivoting the pawl about the pin when the pawl is moved by engagement with the ratchet to shift the pin from one end of the slot to the other end of the slot and then released from the ratchet for shifting the pawl between a stop position and a rewind position and means to move the pawl to shift the pin from said other end of the slot to said one end of the slot at the commencement of unwinding the cord to cause the spring to place the pawl in the stop position to engage the ratchet when the reel starts to rewind the cord, the improvement comprising:
- a switch biased to the open position in series with the cord secured to the hub,
- a switch operating member adapted to be engaged by the pawl for closing the switch when the pawl is in the stop position for supplying current to the cord and light socket as the cord is unwound from the drum and while the pawl and ratchet are engaged to prevent the rewinding of the cord.

* * * * *